Jan. 29, 1957  R. H. HARWOOD  2,779,106
SONAR SIMULATOR
Filed Aug. 20, 1953  2 Sheets-Sheet 1
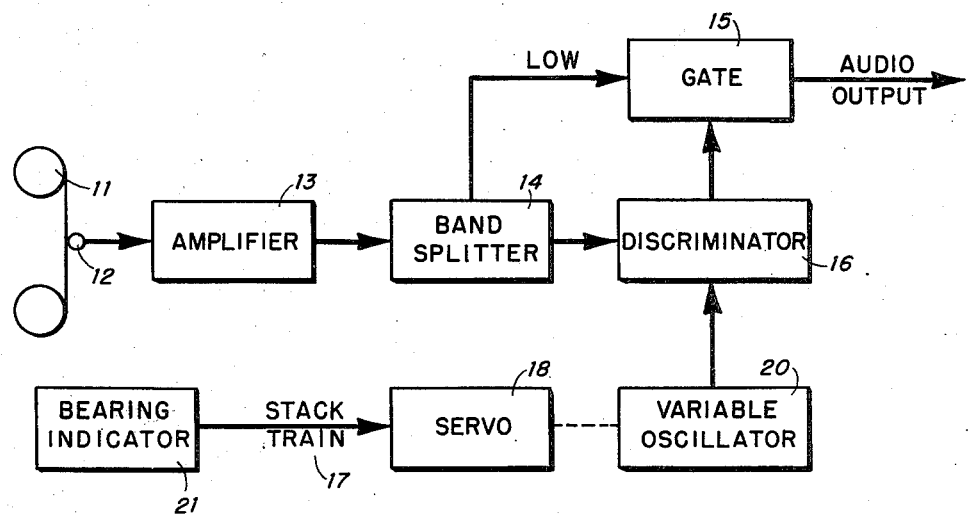
Fig. 1
Fig. 2
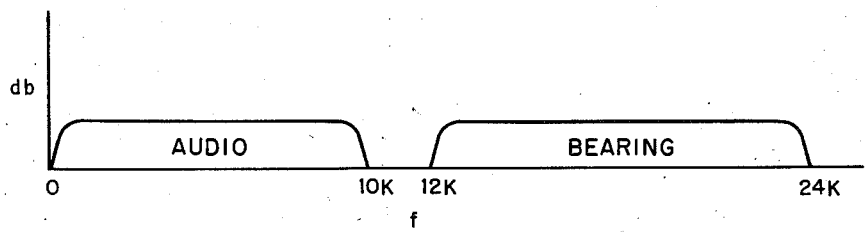
INVENTOR.
ROBERT H. HARWOOD
BY George Sipkin
George E. Pearson
ATTORNEYS Jan. 29, 1957 — R. H. HARWOOD — 2,779,106
SONAR SIMULATOR
Filed Aug. 20, 1953 — 2 Sheets-Sheet 2

INVENTOR.
ROBERT H. HARWOOD
ATTORNEYS

United States Patent Office 2,779,106
Patented Jan. 29, 1957

2,779,106
SONAR SIMULATOR

Robert H. Harwood, San Diego County, Calif., assignor to the United States of America as represented by the Secretary of the Navy Application August 20, 1953, Serial No. 375,579

7 Claims. (Cl. 35—10.4)

(Granted under Title 35, U. S. Code (1952), sec. 266)

The invention described herein may be manufactured and used by or for the Government of the United States of America for governmental purposes without the payment of any royalties thereon or therefor.

This invention relates to educational devices and more specifically to a sonor simulator.

It is an object of this invention to provide a realistic sonar simulator wherein recorded range and bearing information is utilized.

It is a further object to provide a sonar simulator having positive means for eliminating false bearing indications.

Still a further object is the provision of a simulator which yields realistic range or noise and bearing information.

Another object is the provision of a simulator utilizing information recorded simultaneously in discrete frequency bands.

Other objects and many of the attendant advantages of this invention will be readily appreciated as the same becomes better understood by reference to the following detailed description when considered in connection with the accompanying drawings, wherein:

Fig. 1 is a block diagram illustrating the invention;

Fig. 2 is a graphical illustration of the various frequency bands utilized in the present embodiment of the invention;

Figure 3:
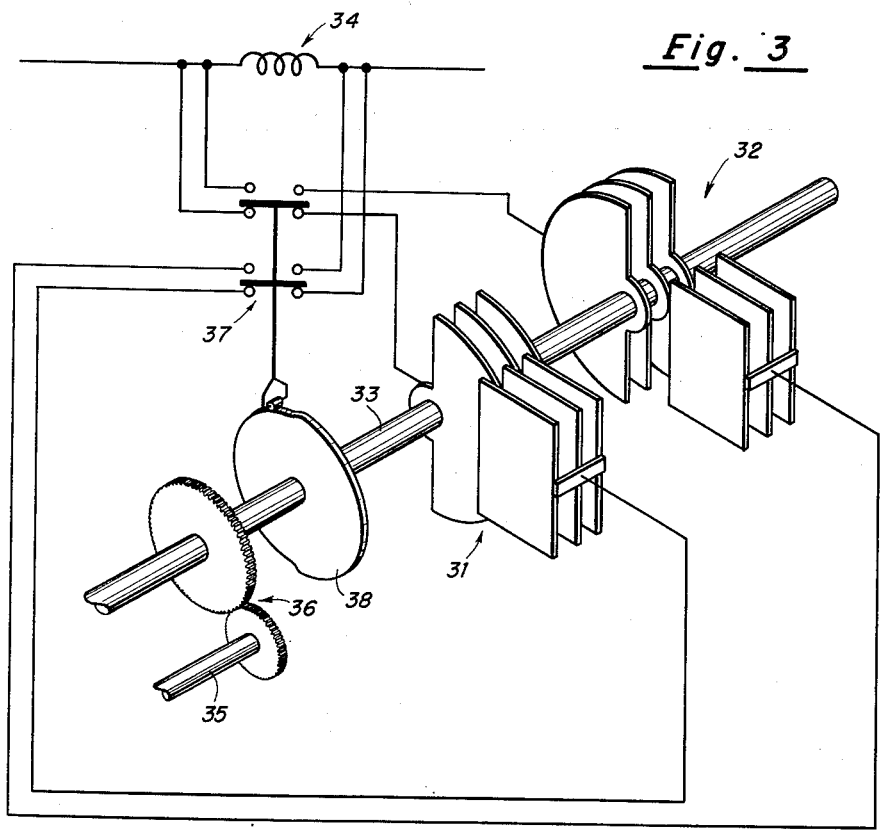
Fig. 3 is a schematic illustration of the frequency control in the variable oscillator.

Referring to the drawings, a recording medium such as magnetic tape 11 has a plurality of signals recorded thereon. Preferably these signals are recorded on the tape 11 by suitable recording mechanisms in conjunction with a sonar system under actual operating conditions. In the illustrated embodiment the tape 11 has two signals each in a different frequency band recorded thereon, one being an audio signal from approximately 20 C. P. S. to 10 kc., and the second being a frequency modulated wave in a spectrum different from the spectrum of the audio signal, in the illustrated system this second signal being in the 12 kc.–24 kc. spectrum. The audio signal represents the audio spectrum and the elapsed time or distance information while the frequency modulated signal represents bearing information.

Both of these signals are recorded simultaneously on the tape during the operation of the sonar gear under actual conditions at sea and, since they are each in different frequency bands, may both be transcribed or reproduced with one transducer, such as indicated at 12 in the reproducing system.

In recording the signals on the tape 11, the audio signal may be transcribed directly from the output of the audio system of the operating sonar gear, or if desired may be arbitrarily fed in to portray a fictitious set of circumstances. The frequency modulated signal may be connected to the bearing training mechanism of the sonar gear in such manner that the output frequency of the circuitry is modulated as a function of the bearing angle of the sonar transducer, or on the other hand, a varying frequency modulated signal to indicate a varying bearing may be recorded to simulate a particular desired set of circumstances.

In operation the tape 11 is fed past a suitable transducer 12, and the composite wave form picked up by the transducer is fed to an amplifier 13. The output of the amplifier is fed to a band splitter or filter circuit 14 where the audio signal is separated from the frequency modulated signal. The band splitter 14 has two outputs, one of which passes the audio signal directly to a gate circuit 15, and the other of which feeds the frequency modulated signal to a discriminator 16.

An operator controllable stack train 17 suitably connected to a bearing indicator 21 drives a servo 18, the angular position of whose rotor controls the frequency of an oscillator 20. The output of the oscillator 20 is connected as a second input into the discriminator 16.

Oscillator 20 is so calibrated that its frequency will equal the frequency of the recorded frequency modulated signal when the bearing indicator and stack train 17 are trained to the same bearing as that of the transducer used to make the original recording. The discriminator produces an output voltage that serves as the bias for the gate circuit 15, and when the local oscillator 20 is at the same frequency as the recorded frequency modulated signal the output of the discriminator 16 is zero voltage. It will thus be apparent that when the bearing of the stack train 17 is the same as that of the transducer utilized in the original pick-up and recording, the discriminator output bias will be zero and the gate circuit 15 will permit the audio signal to pass on to the audio output which may be amplifier stages and a speaker, or merely directly to a speaker, earphones, or the like.

The frequency control of the oscillator 20 is obtained by two variable condensers 31 and 32 that are 180 electrical degrees apart and whose movable plates are mounted on and insulated from the same shaft 33. The condensers 31, 32 each comprise the capacitive branch of a resonant tank circuit 34 or other frequency controlling branch of the oscillator 20, which may be any conventional type such as a Hartley oscillator.

Figure 4:
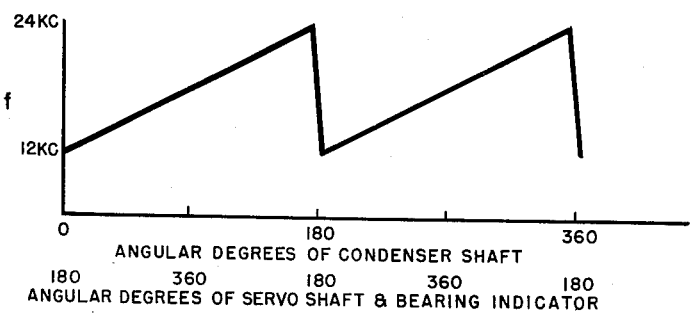
Fig. 4 is a graphical illustration of the oscillator output.

The condenser shaft 33 is geared on a one to two ratio with the shaft 35 of the servo 18, as indicated at 36. Referring to Figs. 3 and 4, it will thus be seen that from 180° relative bearing, the frequency varies from a low frequency, in the instant example 12 kc., to a high value, in this case 24 kc., as the bearing indicator progresses from 180° relative bearing in a clockwise manner, and from 24 kc. to 12 kc. for counterclockwise progressions of the indicator bearing. When the 180° relative bearing point is reached while progressing in either direction a switch, generally designated 37, is operated by a cam 38 on condenser rotor shaft 33 and reverses the connection in the oscillator tank circuit 34 whereby the other of the two condensers is placed into active circuit relation in the oscillator 20. It will thus be seen that at the 180° relative bearing point the frequency is abruptly changed from 24 kc. on the smaller bearing angle side (i. e., 179+°) to 12 kc. on the larger side (i. e., 181—°). This gives a sawtooth-type of frequency control that prevents false bearings. The abrupt change in frequency does not interfere with the effectiveness of the system since there is essentially no target signal received on this bearing in normal operation on a ship because of own ship's propeller noises and/or baffles.

Obviously many modifications and variations of the present invention are possible in the light of the above teachings. It is therefore to be understood that within the scope of the appended claims the invention may be practiced otherwise than as specifically described.

What is claimed is:

1. A sonar trainer comprising a recording medium having first and second signals recorded thereon, said first signal being a carrier frequency modulated in proportion to a variable bearing angle corresponding to the instantaneous bearing angle at which said second signal is originally recorded, gate means for passing or blocking said second signal, means for reproducing from said recording medium said signals, means for separating said signals and for applying said second signal to the input of said gate means, means for generating a controllable variable frequency signal, a bearing indicating means, the frequency of output of said signal generating means varying directly in response to the bearing angle indicated by said bearing indicating means, discriminator means having a pair of input means, said first signal and the output signal of said signal generating means being applied to the inputs of said discriminator means, the output of said discriminator being connected in biasing relation to said gate.

2. A sonar simulator comprising a discriminator having two inputs, means for applying a first frequency modulated signal to one input of said discriminator, said signal being at each instant frequency modulated in proportion to an instantaneous bearing angle, variable frequency oscillator means having its output connected to a second input of said discriminator, a bearing angle indicating means, the frequency of said oscillator being proportioned to the bearing angle indicated by said indicating means, said discriminator having an output proportional to the frequency difference between its two input signals, gate means, the output of said discriminator being connected in bias relation to said gate means, an intelligence signal applied to the input of said gate, the bias applied by said discriminator being effective to open or close said gate means to thereby pass or block said intelligence signal.

3. A sonar simulator as defined in claim 2 wherein said oscillator means has a rotatable frequency control element rotatable 180 angular degrees and 360 electrical degrees for every 360° angular movement of said bearing angle indicating means.

4. A sonar simulator as defined in claim 2 wherein said oscillator means has a frequency control element operably connected to said bearing angle indicating means, said control element comprising a shaft having a pair of condensers mounted thereon 180 electrical degrees apart, said condensers being the capacitive branch of a resonant tank circuit in said oscillator means.

5. A sonar simulator as in claim 4 wherein there is provided means for alternately connecting said condensers into said tank circuit.

6. A sonar simulator as in claim 5 wherein said last named means comprises a cam secured onto said shaft, and a cam follower having two positions and having switch contacts operably connected thereto, said contacts being operable to connect one of said condensers into said tank circuit in one of said two cam follower positions, and being operable to connect the other of said condensers into said tank circuit in the other of said cam follower positions.

7. A sonar simulator as in claim 6 wherein said shaft is connected in a one-to-two gear ratio with said bearing indicating means.

References Cited in the file of this patent

UNITED STATES PATENTS

| | | |
|---|---|---|
| 2,545,191 | Brettell | Mar. 13, 1951 |
| 2,548,684 | Roth | Apr. 10, 1951 |